April 14, 1970        J. BROOME        3,506,554
APPARATUS FOR SEPARATING ELECTROPHORETICALLY ACTIVE SUBSTANCES
Filed March 15, 1968        2 Sheets-Sheet 1

INVENTOR
JOHN BROOME

BY
Sughrue, Rothwell, Mion, Zinn & Macpeak
ATTORNEYS

United States Patent Office 3,506,554
Patented Apr. 14, 1970

3,506,554
APPARATUS FOR SEPARATING ELECTROPHO-RETICALLY ACTIVE SUBSTANCES
John Broome, Philadelphia, Pa., assignor to
Samuel Raymond, Philadelphia, Pa.
Continuation-in-part of application Ser. No. 546,102,
Apr. 28, 1966. This application Mar. 15, 1968, Ser.
No. 715,485
Int. Cl. B01k 5/00
U.S. Cl. 204—180                    5 Claims

ABSTRACT OF THE DISCLOSURE

A process and apparatus for separating electrophoretically active substances utilizes a continuously flowing stream of buffer to carry the substances through a zone having an inert material which is permeable to either the electrophoretically active material or small buffer ions. An electric field is applied first in one direction and then in a changed direction so that at least some of the electrophoretically migrating components migrate into the inert material leaving other components in the stream, and when the direction of the electric field is changed, the electrophoretically migrating components migrate back into the stream so that at least electrophoretically active components are separated first. The cycle of reversing the direction of the electric field is repeated many times. Preferably the inert immobile material is in the form of a matrix having interstices through which the buffer flows, although it could be a gel slab at one side of the buffer stream. Preferably the reversing field is applied from any direction although it could, with the gel slab arrangement, be applied from opposite sides of the fixed gel slab.

CROSS REFERENCE TO RELATED APPLICATIONS

This application is a continuation-in-part of prior application Ser. No. 546,102, filed Apr. 28, 1966, now abandoned, titled "Process and Apparatus for Electrophoretic Separation," inventor John Broome assignor to Samuel Raymond.

BACKGROUND OF INVENTION

Field of invention

This invention relates to improvements in process and apparatus for separating electrophoretically active substances.

Prior art

Mixtures of electrophoretically active substances, such as proteins, have heretofore been separated by various known processes of electrophoresis. For example, to analyze a protein mixture by paper electrophoresis, a strip of suitable paper is wetted with a buffer solution; a sample of proteins dissolved in buffer solution is placed on the paper; a current of electricity is passed along the paper in one direction from one end to the other, so that an electric field is maintained in the paper strip, the protein components migrate along the paper strip in a direction parallel to the electric field at migration rates characteristic of each specific protein component; thus, each specific component migrates to a specific location along the strip in a predetermined time thereby becoming separated from the others; and the specific components so separated are located and quantitated by colorimetric or other means. To improve the resolution of the analysis various other known supporting media have been employed, for example, a slab of polyacrylamide gel has been used as supporting media.

The recovery of purified components from protein mixtures or other mixtures containing at least one electrophoretically active constituent may be effected by known processes involving, as a first step, processes similar to the analytical process just described, conducted on either a batchwise or continuous-flow basis. For example, paper electrophoresis may be carried out as a batch process and separated components recovered by elution from selected excised portions of the paper strip; or, in a known continuous-flow process, the sample dissolved in the buffer may be continuously applied to a vertical, hanging sheet of paper and allowed to flow downwardly by gravity, while being subjected to a transverse electric field which causes the components to migrate transversely; the result of the two simultaneous motions is that different components reach the bottom edge of the paper at different places where they may be separately collected.

There are other electrophoretic processes presently known in the art which are more or less similar to those described above. It is characteristic of all known electrophoresis processes that they all use direct current continuously applied in one direction only in order to effect electrophoretic migration of the components as desired, although the direct current may be furnished by a power supply and obtained by converting alternating current. It is also characteristic of known electrophoresis processes that components of lower electrophoretic mobility move more slowly and are not separated as effectively as components of higher electrophoretic mobility.

The known electrophoretic processes leave much room for improvement in certain respects, such as resolving power, rapidity of operation, sensitivity of detection, dilution of components and adaptability to various supporting media.

SUMMARY OF THE INVENTION

This invention provides an electrophoresis process and apparatus which will increase the sensitivity of detection of individual components, shorten the time required for both preparative and analytic processes, improve the resolution of closely related components and permit the detection and recovery of components of very low or even zero electrophoretic mobility.

The process of this invention includes flowing a stream of buffer through a zone having an immobile matrix which is permeable to electrophoretic materials to be separated, injecting a mixture sample containing at least some electrophoretically active material into the flowing buffer stream, applying an electric field in a direction to cause a portion of the mixture having faster electrophoretically migrating components to migrate into the immobile matrix leaving a portion of the mixture having slower electrophoretically migrating components in the flowing buffer stream, and after the stream has continued to flow so that the two components are further separated then reversing the direction of electric field so that the faster migrating components are returned to the flowing stream. The field reversal and stream flow are repeated, either successively or simultaneously, as many times as necessary to achieve the desired degree of separation of the components in the mixture sample.

In a preferred embodiment the immobile matrix is positioned in the path of the flowing stream of the buffer and has interstices through which the buffer flows, and in this embodiment the electric field may be applied at any angle to the direction of flow of the buffer. In another embodiment the immobile matrix is in the form of slabs and the electric field is applied at a direction transverse to the flow of the buffer adjacent a surface of the slab.

Thus, it is the fundamental concept of this invention to remove and then replace electrophoretically active components of substances in a flowing buffer stream by alternately reversing an applied electric field.

The apparatus of this invention for carrying out the process includes electrically non-conducting supporting and containing members and chambers for the flowing stream of buffer immobile matrix, and conductive electrodes through which the reversing electric field is applied.

BRIEF DESCRIPTION OF THE DRAWINGS

The invention will be described by way of example in connection with the accompanying drawings in which.

DESCRIPTION OF PREFERRED EMBODIMENTS

Figure 1:
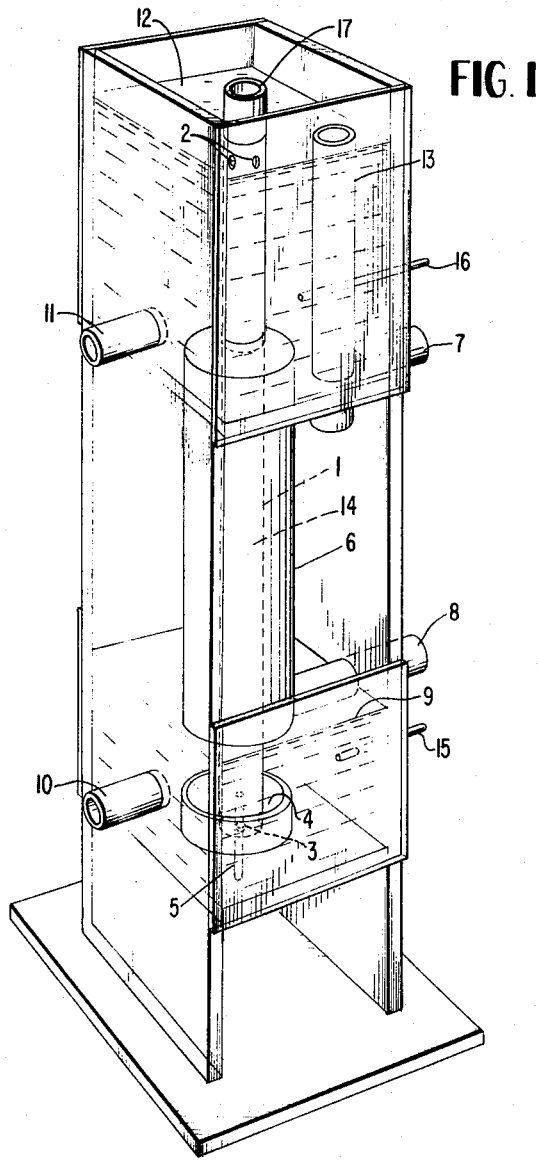
FIG. 1 is a perspective view of a preferred form of electrophoretic apparatus for practicing the process of this invention.
Figure 2:
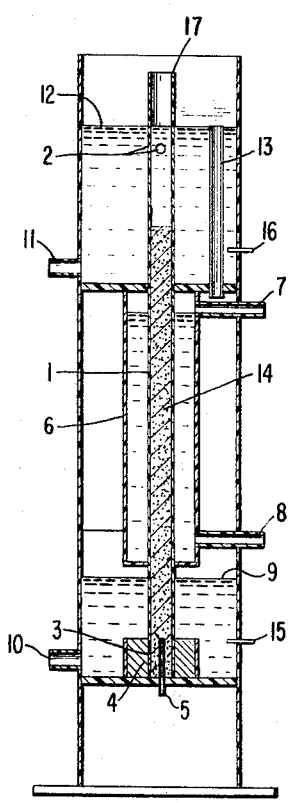
FIG. 2 is a schematic longitudinal cross sectional elevation view of the apparatus shown in FIG. 1.
Figure 3:
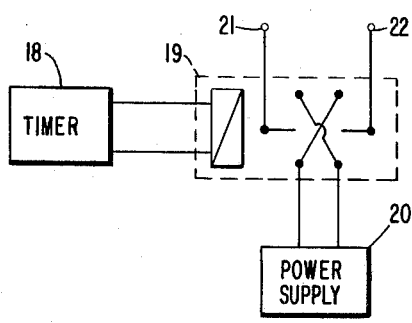
FIG. 3 is a schematic circuit diagram of a power supply for supplying the reversing electric field.

FIGS. 1–3 illustrate the preferred embodiment of the process and apparatus of the invention in which a flowing buffer stream passes through interstices of an immobile matrix which is at least partially permeable to electrophoretic materials to be separated, and a mixture sample containing at least some electrophoretically active materials injected into the flowing buffer stream. An electric field can be applied at any angle to the direction of flow when the buffer passes through the interstices of the matrix so that a portion of the mixture enriched in faster electrophoretically migrating components migrates to the immobile matrix leaving a portion of the mixture, enriched in slower electrophoretically migrating components in the flowing buffer stream. While the stream is flowing further the direction of the electric field is reversed returning the faster migrating components to the buffer stream. This field reversal may be continued as many times as necessary to achieve the desired degree of separation of components.

This process permits a substantial degree of freedom from the limitations inherent in electrophoretic techniques previously known. This follows from the fact that physical transport is no longer effected exclusively by electrophoresis, but the electrophoretic parameters control the partition of the sample components between a stationary matrix and flowing stream, while actual transport of the components is carried out by the flowing stream. Thus the least electrophoretically active materials will be the first transported out by the flowing stream.

FIGS. 1–3 illustrate one suitable apparatus for accomplishing this type of separation. The apparatus includes a column with walls of inert electrically insulating material filled with a slurry of granules which constitute the matrix having interstices through which a buffer can flow. The buffer liquid forms a continuous phase in the interstices between the granules. It is preferred to use granules which are semi-permeable, i.e., which permit small molecules and ions to pass freely through their interior, but which restrict or impede to a degree the entry of desired components of the sample. Hence the sample is normally confined to the interstitial spaces. If an electric field is applied across such system, some components of the sample will enter the granules. Components entering the interior of a granule may be recovered into the interstices in the flowing buffer stream either by electromigration entirely through the granule, by diffusion therefrom, or by reversing the electric field. The flow of buffer through the column carries with it the desired components through the column although each component is retarded to some extent in proportion to the time spent within the stationary matrix.

With the apparatus of FIGS. 1–3 it is convenient for the field to be applied along the axis of the column. However, this is not essential since separation is obtained with any orientation of the alternating field with respect to the axis of flow. In the FIGS. 4 and 5 embodiment the reversing field is set perpendicular to the flow of buffer as this is advantageous with a preparative scale instrument since the temperature may be more readily controlled through the larger surface area per unit volume of a column with rectangular cross section.

Referring specifically to FIGS. 1 and 2, a column 1 of electrically insulating material contains semi-permeable granular packing 14 supported vertically which forms the inert matrix and provides interstitial spaces between the granules. The upper end of the packing 14 communicates with an upper buffer reservoir 12 via openings 2 and this upper reservoir is filled with an electrically conducting buffer liquid.

The lower end of packing 14 is in fluid communication with a lower buffer reservoir 9 through openings 3 which, however, are filled with an electrically conducting semi-permeable gel 4. The lower end of column 1 is provided with a liquid effluent connection 5.

For cooling, a cooling jacket 6 receives a supply of liquid coolant through inlet and outlet connections 7 and 8. Electrophoretic buffer is pumped from lower reservoir 9 through outlet port 10 to a buffer inlet 11 of the upper buffer reservoir 12. The buffer liquid is pumped at such a rate that excess is returned to the lower tank by means of an overflow tube 13. This arrangement ensures that the granular packing 14 experiences a constant head of buffer.

Voltage is supplied to two electrodes 15 and 16. A sample containing at least some electrophoretically active components may be conveniently pipetted into the granular packing 14 through an open top 17 of column 1.

FIG. 3 is a circuit diagram of a suitable power supply which per se forms no part of this invention. Any device capable of providing an alternating voltage with periods in the range of 0.2 to 0.02 Hz. can be employed. As shown in FIG. 3 a simple power supply includes a reversing relay 19 driven by a repeating timer 18. Voltage is supplied to the relay from a DC supply 20, typically 500 volts. The output side of the relay is connected to the cell electrode 16 via suitable interconnections 21 and 22.

The buffer of this invention may be defined as a fluid capable of dissolving the desired components of the electrophoretically active mixture and substantially maintaining their electrophoretic properties constant during the separation.

The mixture separated will be referred to as a protein mixture although understood that mixtures containing other electrophoretically active substance can also be separated in accordance with the invention.

In practicing the preferred embodiment of this invention shown in FIGS. 1–3, the tanks 9 and 12 are filled with the buffer solution which is continuously circulated by pumping from the lower reservoir 9 to the upper reservoir 12 via pumping fluid lines (not shown). The effluent connection or outlet 5 is connected to a recording analyzer, such as a recording spectrophotometer set to record at a wavelength within the absorption band of a protein. Electrodes 15 and 16 are connected to a source of DC electrical power which includes means for reversing the polarity of the electrodes periodically such as the arrangement in FIG. 3. The periodicity of the reversing may range from a few cycles per second up to a few cycles per hour, depending upon the electrophoretic mobility of the protein to be separated. With a constant stream of buffer flowing through column 1 and through the interstices of the granules 14 therein, a suitable pre-run period is employed to make sure that the apparatus is in stable dynamic equilibrium and that a stable base line is obtained. Then a volume of sample is pipetted onto the column bed or granules 14 through port 17. This sample is carried into the granular packing by the buffer stream. The electric field is applied by electrodes 15 and 16. In a non-limiting example of an experiment a voltage of 450 volts was alternated every 35 seconds. The 1 cm. diameter column was packed with acrylamide gel sold under the trade name "Biogel P20" to provide a column bed height of 20 cms. The coolant was 8° C. and a pH 8.4 buffer was circulated through the packed column. Under these circumstances 20 ma. was drawn from the power supply. The flow rate of buffer through the column was 0.2 ml./min. The sample, a mixture of mg. of bovine serum albumin and 5 mgs. of human hemoglobin was introduced in 50 μl. of the buffer. Hemoglobin started to emerge after 22 minutes and continued for a further 24 minutes; 6 minutes after hemoglobin was no longer detectable in the eluate, albumin began to come off. It continued for 12 minutes. The purity of both fractions was checked by conventional electrophoresis and no contamination was evident in either.

In order to understand how this invention provides separation, consider first a component of zero electrophoretic mobility in the buffer stream. The electric field has no effect on such a component, and hence a zero mobility component is never trapped within an immobile granule. On the contrary, it moves forward at the same rate as the buffer stream itself at all times and so it emerges from the column as soon as the buffer stream carrying it reaches the end of the column.

Now consider a component whose mobility is such that it lodges half the time in the immobile granules of the column and half the time in the buffer stream when the current is reversed. Obviously, such a component will travel through the stream at half the average rate of speed of the buffer flow so that its time of emergence will be twice that of the zero mobility component.

Similarly, components of intermediate mobility will lodge for proportional times in the immobile granule matrix and in the buffer stream so that their times of emergence will be intermediate. Thus all the components of the mixture will traverse the column in times inversely related to their electrophoretic mobilities and will emerge sequentially in the buffer stream, the electrophoretically slowest migrating component emerging first, followed by the faster migrating components in order. This reverse order of emergence from the separating column is a characteristic feature of this invention.

The operating parameters of the device can, of course, be adjusted to optimize conditions for substances of any mobility. This action can either be taken before experiment or the parameters can be graded during the course of an experiment. For instance, when the resolution of a mixture containing exceptionally mobile species is required the product of the field and period can be gradually reduced after any slow components have emerged. Such a process can considerably reduce the time of a run without impairing resolution.

Figure 4:
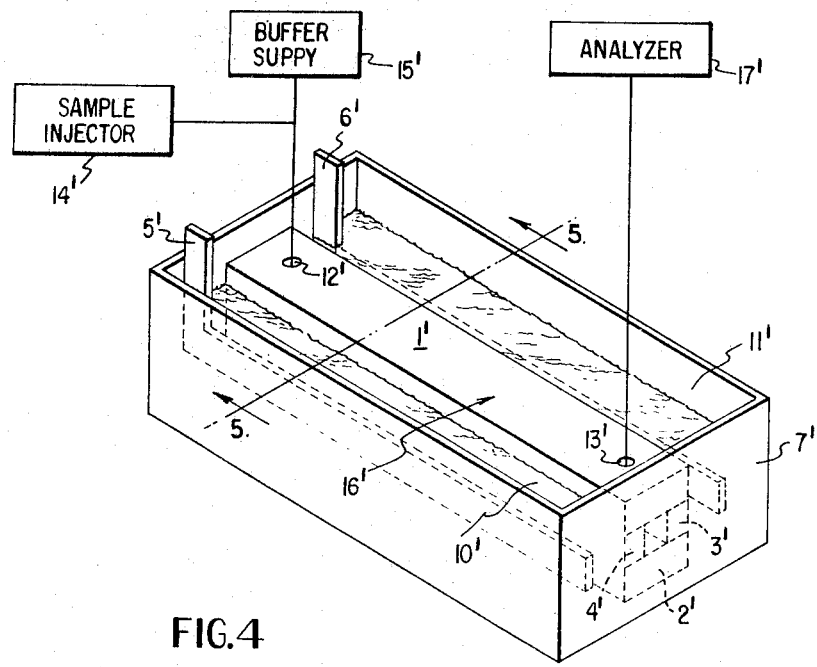
FIG. 4 is a perspective view of a modified electrophoresis apparatus within the scope of this invention.
Figure 5:
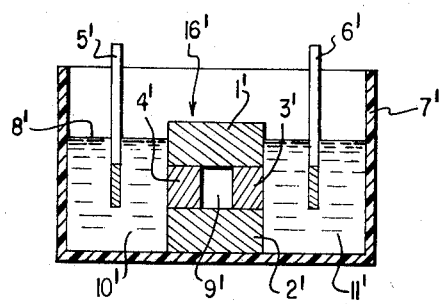
FIG. 5 is a sectional elevation taken along line 5—5 of FIG. 4.

A preparative electrophoresis apparatus shown in FIGS. 4 and 5 illustrates the basic principle of this invention in a separate modification. This embodiment includes a chamber 7' holding various components of the apparatus. The chamber is divided into two compartments 10' and 11' by a partition 16'; within partition 16' is a channel 9'. At one end of partition 16' in inlet 12' to which is connected buffer supply 15' and a sample injector 14' as shown schematically in FIG. 4. At the other end of partition 16' is an outlet 13' through which the buffer stream may be conducted to an analyzer 17'; a fraction collector is also shown schematically in the drawing. In each of the two compartments 10' and 11' in chamber 7' there is an electrode, electrodes 5' and 6', respectively so that electric current can be supplied to the buffer contained in tank 7' thereby creating an electric field within the tank. The major fixed parts of the apparatus are constructed of substantially electrically non-conducting materials except for electrodes 5' and 6' which must be electricaly conducting and except certain permeable materials to be described.

FIG. 5 is a sectional view taken along line 5—5 of FIG. 1 and shows that the partition 16' defining channel 9' provides channel 9' with a square cross section bounded by an upper plate 1' and lower plate 2' which may contain cooling channels (not shown). Between these two plates are two blocks of protein permeable material 3' and 4', which may for example be blocks or slabs of polyacrylamide gel. Blocks 3' and 4' provide immobile zones of material which are permeable to electrophoretically active materials and which lie along the path of the buffer stream. Buffer fills chamber 7' up to buffer level 8' and the electrodes 5' and 6' are immersed in the buffer.

In practicing the invention with the embodiment of FIGS. 4 and 5, inlet 12' is connected to a source of buffer solution which may be, for example, an elevator tank of buffer draining into inlet 12' through a gravity feed 2'. The outlet 13' is connected to a recording analyzer 17' such as a recording spectrophotometer set to record at a wavelength within the absorption band of a protein solution. Sample injector 14' in the inlet tube may be a short length of rubber tubing where a hypodermic needle may be inserted for the delivery of a sample into the flowing buffer stream. Electrodes 5' and 6' are connected to a source of DC electrical power which includes means for reversing the polarity of the electrodes periodically. Again the periodicity of the reversing may range from a few cycles per second up to a few cycles per hour depending on the electrophoretic mobility of the protein to be separated.

Again a constant buffer stream is run through channel 9' for a pre-run period to establish stable dynamic equilibrium and a stable base line. Then a volume of sample is injected, this sample is carried into channel 9' along with the buffer stream. The electric field is applied through the channel walls corresponding to permeable blocks 3' and 4'; by applying forward polarity to electrodes 5' and 6' some fast migrating components of the sample passing through channel 9' migrate into block 3' leaving slower migrating components still in the channel, thereby at least a partial separation of the fast and slow moving components is obtained.

The buffer flow is allowed to continue until the sample remaining in the channel has moved some selected distance along the channel, the electric field is then reversed in direction by reversing polarity of the electrodes. This causes the protein components trapped in block 3' to return to the channel and some components further along migrate into adjacent part of block 4' thereby obtaining an additional degree of electrophoretic separation. These cycles are continued until all protein components eventually emerge from outlet 13' for analysis or recovery.

The operation of the FIGS. 4 and 5 embodiment is substantially the same as that of the FIGS. 1–3 embodiment but the FIGS. 1–3 embodiment has the advantage in that the immobile matrix is in such a form that the buffer must flow through interstices in it and the reversing field may be applied in any direction. This obviously has certain advantages over the embodiment shown in FIGS. 4 and 5.

In the embodiment of FIGS. 1–3 the immobile matrix is not limited to a granular slurry. For example, a porous sponge could be used and it may be preferably in certain instances.

Thus in accordance with the present invention there are disclosed a highly useful apparatus and process for electrophoretic separation of the components of electrophoretically active mixture.

It will be understood that various modifications may be made by those skilled in the art in the process and apparatus described herein by way of illustration without departing from the spirit of the invention as defined in the appended claims.

I claim:

1. An electrophoretic process for separating the components of a mixture, at least some of said components being electrophoretically active, the process comprising:
   (a) continuously flowing a stream of buffer through a zone containing an immobile matrix which is at least semi-permeable to either the electrophoretically active material of smaller buffer ions,
   (b) injecting the mixture into the flowing stream to pass over at least a portion of the inert matrix while being carried by the buffer,
   (c) applying an electric field in a first direction through the stream to cause at least some of the electrophoretically active migrating components of the mixture to migrate into the matrix leaving a portion of the stream enriched in slower electrophoretically migrating components, and
   (d) changing the direction of the electric field to cause at least some of the electrophoretically migrating components to migrate from said immobile matrix back into said buffer stream.

2. A process as in claim 1, further comprising repeatedly applying and changing the direction of the electric field as defined in steps (c) and (d) to effect periodic reversal of the direction of the electric field until substantial separation of the components of the mixture is effected.

3. A process as in claim 1 wherein the immobile inert matrix is positioned in the path of flow of the buffer stream and has interstices for the buffer stream to flow therethrough, and the electric field is applied in the first direction at any selected angle with respect to the direction of flow of the stream.

4. A process as defined in claim 1 wherein the direction of the electric field is at a substantial right angle to the direction of flow of the stream and the inert matrix is in the form of a slab confining at least a portion of the stream.

5. A process as in claim 3 wherein the electric field is applied substantially parallel to the direction of flow of the buffer stream.

References Cited
UNITED STATES PATENTS

| | | | |
|---|---|---|---|
| 2,625,374 | 1/1953 | Neuman | 255—1.8 |
| 3,290,240 | 12/1966 | Neren | 204—299 |
| 3,326,790 | 6/1967 | Bergrahm | 204—180 |
| 3,341,441 | 9/1967 | Giuffrida et al. | 204—180 |

JOHN H. MACK, Primary Examiner

A. C. PRESCOTT, Assistant Examiner

U.S. Cl. X.R.

204—299, 301

UNITED STATES PATENT OFFICE
CERTIFICATE OF CORRECTION

Patent No. 3,506,554　　　　　　　　　Dated April 14, 1970

Inventor(s) John Broome

It is certified that error appears in the above-identified patent and that said Letters Patent are hereby corrected as shown below:

Column 7, line 11　　　　"of smaller buffer ions" should read
　　　　　　　　　　　　　--or smaller buffer ions--

SIGNED AND
SEALED
NOV 3 1970

(SEAL)
Attest:

Edward M. Fletcher, Jr.
Attesting Officer

WILLIAM E. SCHUYLER, JR.
Commissioner of Patents